United States Patent

Negishi

(10) Patent No.: US 8,797,520 B2
(45) Date of Patent: Aug. 5, 2014

(54) WAVEFRONT ABERRATION MEASURING DEVICE AND METHOD AND WAVEFRONT ABERRATION ADJUSTING METHOD

(75) Inventor: Taketoshi Negishi, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/713,598

(22) Filed: Feb. 26, 2010

(65) Prior Publication Data

US 2010/0149549 A1    Jun. 17, 2010

Related U.S. Application Data

(63) Continuation of application No. PCT/JP2008/064523, filed on Aug. 13, 2008.

(30) Foreign Application Priority Data

Aug. 27, 2007    (JP) .................................. 2007-219215

(51) Int. Cl.
G01B 9/00    (2006.01)

(52) U.S. Cl.
USPC ......................................................... 356/124

(58) Field of Classification Search
CPC ............ G01M 11/02; G01M 11/0242; G01M 11/0257
USPC .................. 356/521, 512–515, 497, 499, 124
See application file for complete search history.

(56) References Cited

U.S. PATENT DOCUMENTS

| | | | |
|---|---|---|---|
| 4,033,696 A | 7/1977 | Nohda | |
| 4,682,025 A | 7/1987 | Livingston et al. | |
| 5,059,022 A | 10/1991 | Ookawa | |
| 2001/0019415 A1 * | 9/2001 | Prikryl et al. | ................. 356/498 |
| 2006/0087617 A1 * | 4/2006 | Roorda | .......................... 351/221 |
| 2006/0238710 A1 * | 10/2006 | Dick et al. | ..................... 351/211 |
| 2007/0013918 A1 * | 1/2007 | Hauger et al. | ................. 356/512 |

(Continued)

FOREIGN PATENT DOCUMENTS

| | | |
|---|---|---|
| EP | 158505 A2 | 10/1985 |
| JP | 61-34430 | 2/1986 |

(Continued)

OTHER PUBLICATIONS

International Search Report from Japanese Patent Office for International Application No. PCT/JP2008/064523, Mailed Sep. 22, 2008.

(Continued)

*Primary Examiner* — Jonathan Hansen (74) *Attorney, Agent, or Firm* — Finnegan, Henderson, Farabow, Garrett & Dunner, LLP (57) ABSTRACT

A wavefront aberration measuring apparatus which measures an wavefront aberration of an optical system to be inspected includes a point light source which supplies a measuring light; a photodetector which has a detection surface arranged at a position optically conjugate with the point light source; a wavefront change applying section which is arranged in an optical path between the point light source and the photodetector and which applies a wavefront change to the light outcome from the optical system; and a measuring section which measures the wavefront aberration of the optical system based on an output of the photodetector and the wavefront change applied by the wavefront change applying section. It is possible to measure the wavefront aberration of the optical system with a relatively simple construction, without using the interference method.

13 Claims, 3 Drawing Sheets

(56) References Cited

U.S. PATENT DOCUMENTS

| | | | |
|---|---|---|---|
| 2007/0171366 A1* | 7/2007 | Su et al. | 351/205 |
| 2007/0176077 A1* | 8/2007 | Barchers | 250/201.9 |
| 2008/0079950 A1* | 4/2008 | Harned et al. | 356/512 |

FOREIGN PATENT DOCUMENTS

| | | |
|---|---|---|
| JP | 61-34430 A | 2/1986 |
| JP | 61-118639 A | 6/1986 |
| JP | 11-304641 | 11/1999 |
| JP | 11-304641 A | 11/1999 |
| JP | 2001-235373 | 8/2001 |
| JP | 2001-235373 A | 8/2001 |
| JP | 3417399 | 4/2003 |
| JP | 2007-78434 | 3/2007 |
| JP | 2007-78434 A | 3/2007 |

OTHER PUBLICATIONS

International Search Report from European Patent Office for International Application No. 08828535.8—PCT/JP2008/064523, Mailed Nov. 7, 2012.

Examination Report from Taiwan Intellectual Property Office for Taiwanese Patent Application No. 097132502, Mailed Oct. 15, 2013.

* cited by examiner

WAVEFRONT ABERRATION MEASURING DEVICE AND METHOD AND WAVEFRONT ABERRATION ADJUSTING METHOD

CROSS-REFERENCE

This application is a Continuation Application of International Application No. PCT/JP2008/064523 which was filed on Aug. 13, 2008 claiming the conventional priority of Japanese patent Application No. 2007-219215 filed on Aug. 27, 2007.

BACKGROUND OF THE INVENTION

1. Field of the Invention

The present invention relates to a wavefront aberration measuring apparatus and method, and a wavefront aberration adjusting method. In particular, the present invention relates to a technique using a wavefront sensor which measures information about the wavefront change generated in an optical system to be inspected.

2. Description of the Related Art

It is known that any wavefront aberration is generated from an optical system (broad concept including single optical members such as lenses, mirrors and the like). The wavefront aberration or the wave aberration of an actually manufactured lens is deviated in some cases from a designed value of the wavefront aberration in the lens design. A wavefront sensor of the Shack-Hartmann method, which utilizes a lens array, is known as a wavefront aberration measuring apparatus for measuring the wavefront aberration of an optical system to be inspected, by using the technique other than the interference method or the interferometry (see, for example, Japanese Patent No. 3417399).

SUMMARY OF THE INVENTION

In the wavefront aberration measuring apparatus using the interference method, it is necessary that the light source should be coherent. Therefore, the cost required for the light source is expensive. Consequently, the production cost of the apparatus tends to be expensive as well. Further, any expensive standard (tool for generating the reference wavefront to serve as a reference in the interference method) is required. Therefore, the production cost of the apparatus tends to be more expensive.

The present invention has been made taking the foregoing problem or task into consideration, an object of which is to provide a wavefront aberration measuring apparatus and a wavefront aberration measuring method which make it possible to measure the wavefront aberration of an optical system to be inspected in accordance with a relatively simple construction, without using the interference method. Another object of the present invention is to provide a novel wavefront aberration adjusting method which makes it possible to reduce or counteract the wavefront aberration of an optical system.

In order to solve the problem or task as described above, according to a first aspect of the present invention, there is provided a wavefront aberration measuring apparatus which measures a wavefront aberration of an optical system to be inspected, the wavefront aberration measuring apparatus comprising: a point light source which supplies a measuring light; a photodetector which has a detection surface arranged at a position optically conjugate with the point light source; a wavefront change applying section which is arranged in an optical path between the point light source and the photodetector and which applies a wavefront change to the light outcome from the optical system; and a measuring section which measures the wavefront aberration of the optical system based on an output of the photodetector and the wavefront change applied by the wavefront change applying section.

According to a second aspect of the present invention, there is provided a wavefront aberration measuring method for measuring a wavefront aberration of an optical system to be inspected, the wavefront aberration measuring method comprising: applying a wavefront change to a light radiated from a point light source and outcome from the optical system; detecting a spot light formed on a predetermined surface optically conjugate with the point light source, with the light to which the wavefront change is applied; and measuring the wavefront aberration of the optical system based on the wavefront change applied so that a light intensity of the spot light is maximized.

According to a third aspect of the present invention, there is provided a wavefront aberration adjusting method for adjusting the wavefront aberration of the optical system based on the wavefront aberration measured in accordance with the wavefront aberration measuring method of the second aspect. In this adjusting method, a variable mirror or deformable mirror may be fixed in a state that a desired wavefront aberration is generated, and then the wavefront aberration of the optical system to be inspected may be adjusted so that the light intensity of the spot light is maximized.

In the wavefront aberration measuring apparatus and the wavefront aberration measuring method of the present invention, the wavefront change (change of the wavefront) is applied to a light (light beam) radiated from the point light source and outcome from (via) the optical system to be inspected, while the spot light, which is formed on the predetermined surface optically conjugate with the point light source, is detected. The wavefront aberration of the optical system to be inspected is measured, for example, based on the change of the wavefront applied so that the light intensity of the spot light is maximized.

In this way, in the wavefront aberration measuring apparatus and the wavefront aberration measuring method of the present invention, the wavefront aberration of the optical system to be inspected can be measured in accordance with the relatively simple arrangement or construction, without using the interference method. As a result, it is unnecessary that the light source should be coherent. Therefore, not only the cost required for the light source is decreased, but also any expansive standard is not required. Therefore, it is possible to suppress the production cost of the apparatus to be low.

By using the wavefront aberration adjusting method of the present invention, it is possible to perform the adjustment so that the wavefront aberration of the optical system is efficiently reduced or counteracted.

DESCRIPTION OF THE PREFERRED EMBODIMENTS OF THE INVENTION

Figure 1:
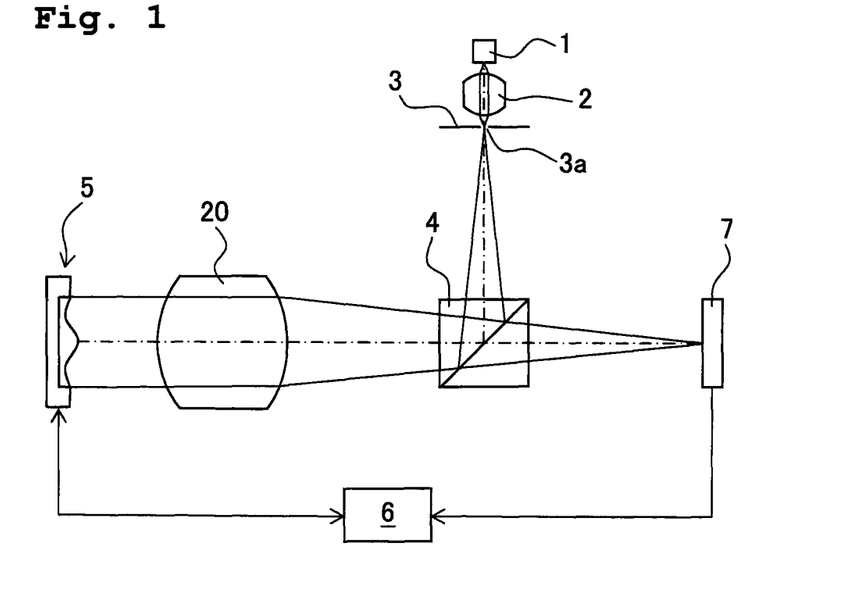
FIG. 1 schematically shows a construction of a wavefront aberration measuring apparatus according to a first embodiment of the present invention.

Embodiments of the present invention will be explained based on the attached drawings. FIG. 1 schematically shows the construction of a wavefront aberration measuring apparatus according to a first embodiment of the present invention. In the first embodiment, the wavefront aberration measuring apparatus of the present invention is applied to the measurement of the wavefront aberration or the wave aberration of an optical system 20 to be inspected constructed of one lens or a plurality of lenses. The wavefront aberration measuring apparatus of the first embodiment includes, for example, a light source 1 which supplies a measuring light (measuring light beam) having a wavelength same as that of a light (light beam) to be used for the optical system 20 to be inspected or tested. Those usable as the light source 1 include an incandescent lamp, a halogen lamp, a mercury lamp, etc.

The light, which is radiated from the light source 1, illuminates, via a light-collecting lens 2, a pinhole 3a which is formed through a pinhole member 3. The light, passing through the pinhole 3a, is provided as a light having an ideal spherical wave, and the light comes into a beam splitter 4. That is, the light source 1, the light-collecting lens 2, and the pinhole member 3 constitute a means for forming the point light source which radiates the light having the ideal spherical wave. The light, coming into and reflected by the beam splitter 4, comes into an optical system 20 to be inspected.

Figure 2:
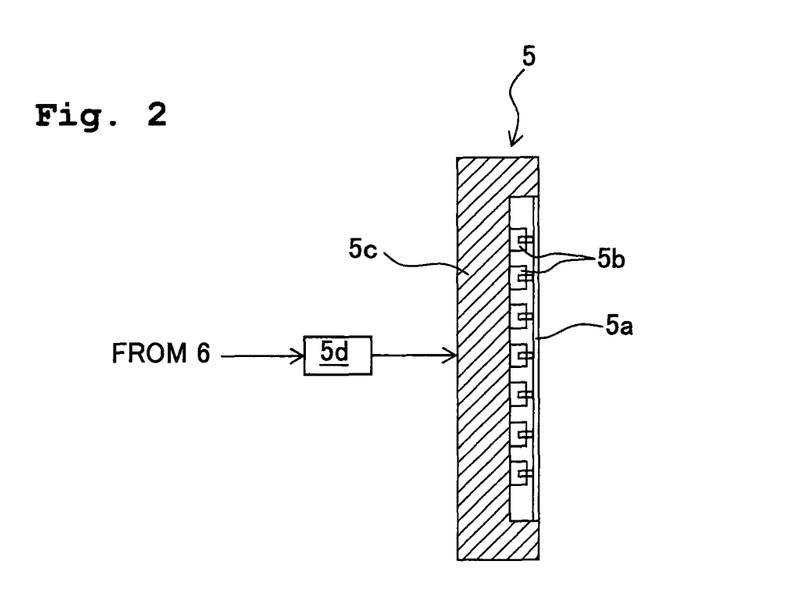
FIG. 2 schematically shows an internal structure of a deformable mirror shown in FIG. 1.

The pinhole 3a of the pinhole member 3 is arranged at the back side focus position of the optical system 20 to be inspected. Therefore, the light, which is transmitted through the optical system 20 to be inspected, comes into a deformable mirror (mirror capable of deformation) 5 in such a state that the light can be regarded as a parallel light (parallel light beam) provided that the influence of the wavefront aberration of the optical system 20 to be inspected is neglected. As shown in FIG. 2, the deformable mirror 5 includes a reflecting member (reflecting mirror) 5a which has, for example, a reflecting surface of a planar shape in the initial state; a plurality of driving elements 5b which are arranged two-dimensionally in parallel to correspond to the reflecting surface (mirror) of the reflecting member 5a; a mirror base member 5c; and a driving section 5d which individually drives the plurality of driving elements 5b. The reflecting member 5a is formed of, for example, a vapor deposition film of gold or aluminum or a dielectric multilayer film.

The driving section 5d individually drives the plurality of driving elements 5b based on a control signal from a control processing system 6. The plurality of driving elements 5b are attached to the mirror base member 5c and changes the reflecting surface of the reflecting member 5a to have a desired surface shape in accordance with the mutually independent pushing/pulling operations or the driving elements 5b. That is, the reflecting surface of the reflecting member 5a can be regarded to be comparted by a plurality of segments, with the positions at which the plurality of driving elements 5b are connected as the center. Those usable as the driving element 5b include, for example, actuators such as piezoelectric elements, ball screws and the like. For example, a reflecting mirror is known as the reflecting member, wherein a silicon nitride thin film, which is applied with an aluminum coat, is used to adjust the voltage applied between the thin film and a back surface electrode so that the mirror shape is deformed thereby in accordance with the electrostatic force. The light, to which the change of the wavefront is applied by the reflection (by being reflected) by the deformable mirror 5, outcomes from the optical system 20 to be inspected and the beam splitter 4, and the light forms an image of the pinhole 3a, i.e., a spot light on a detection surface of a photodetector 7 arranged at a position optically conjugate with the pinhole 3a.

Those usable as the photodetector 7 include PSD (position sensitive detector: position sensor for spot light using the surface resistance of photodiode), CCD (area sensor), etc. Information, which relates to the light intensity of the spot light detected by the photodetector 7, is supplied to the control processing system 6. The control processing system 6 appropriately changes the shape of the reflecting surface of the deformable mirror 5 so that the light intensity of the spot light detected by the photodetector 7 is maximized, while monitoring the output of the photodetector 7. For example, the driving elements of the deformable mirror 5 can be controlled as follows. The signal of the photodetector is measured while successively expanding or contracting the plurality of driving elements at an initial setting position of the deformable mirror 5. A driving position, at which the output of the photodetector is maximized with respect to the driving position of each of the driving elements, is stored in a memory (not shown) included in the control processing system 6 as the optimum position for each of the driving elements. After the optimum positions are determined for all of the driving elements, all of the driving elements, i.e., the reflecting surface of the deformable mirror 5 is/are set at the determined driving positions (optimum positions).

If the shape of the reflecting surface of the deformable mirror 5 is same as the shape of the wavefront of the light which is transmitted through the optical system 20 to be inspected and which comes into the deformable mirror 5, then the light, which is reflected by the reflecting surface of the deformable mirror 5, travels reversely as it is along the outbound route along which the light has been transmitted through the optical system 20 to be inspected; and a vivid image (spot light) of the pinhole 3a is formed on the detection surface of the photodetector 7 in a state that the spread is suppressed most intensively, and the light intensity of the spot light (consequently the output of the photodetector 7) is maximized.

In this way, the control processing system 6 appropriately changes the shape of the reflecting surface of the deformable mirror 5 so that the spot light, which is formed on the detection surface of the photodetector 7, has the maximum light intensity; and the control processing system 6 measures the wavefront aberration of the optical system 20 to be inspected, based on the information about the shape of the reflecting surface of the deformable mirror 5 provided when the light intensity of the spot light is maximized, i.e., the information about the change of the wavefront applied by the deformable mirror 5. The deviation, of the wavefront aberration of the optical system 20 to be inspected, from the designed value (ideal wavefront aberration) is also determined from the measured wavefront aberration. In the wavefront aberration measuring apparatus of the first embodiment, the wavefront aberration of the optical system 20 to be inspected can be measured in accordance with the relatively simple construction without using the interference method.

Note that in a case that the optical system 20 to be inspected has no eccentricity component, the spot light is formed on the detection surface of the photodetector 7 at the position of the optical axis. Therefore, for example, when the setting is made such that the center of the detection surface of the photodetector 7 is coincident with the position of the optical axis, it is possible to measure the eccentricity component of the optical system 20 to be inspected, based on the information about the positional deviation of the position of formation of the spot light from the center of the detection surface of the photodetector 7 (generally the position information about the spot light).

Alternatively, the shape of the reflecting surface of the deformable mirror 5 may be appropriately changed so that the spot light is moved to the center position of the detection surface of the photodetector 7 (generally a predetermined position on the detection surface); and the eccentricity component of the optical system 20 to be inspected may be measured based on the inclination component of the shape of the reflecting surface of the deformable mirror 5 provided when the spot light is formed at the center position of the detection surface of the photodetector 7 (consequently the inclination component of the change of the wavefront applied by the deformable mirror 5). Further, the eccentricity component of the optical system 20 to be inspected can be corrected (adjusted), if necessary. If the eccentricity component is present, any influence is exerted on the wavefront which is generated from the optical system 20 to be inspected and which is intended to be detected. Therefore, in order to detect the wavefront aberration more correctly, it is desirable to measure the wavefront aberration in a state that the eccentricity component is corrected (adjusted).

Figure 3:
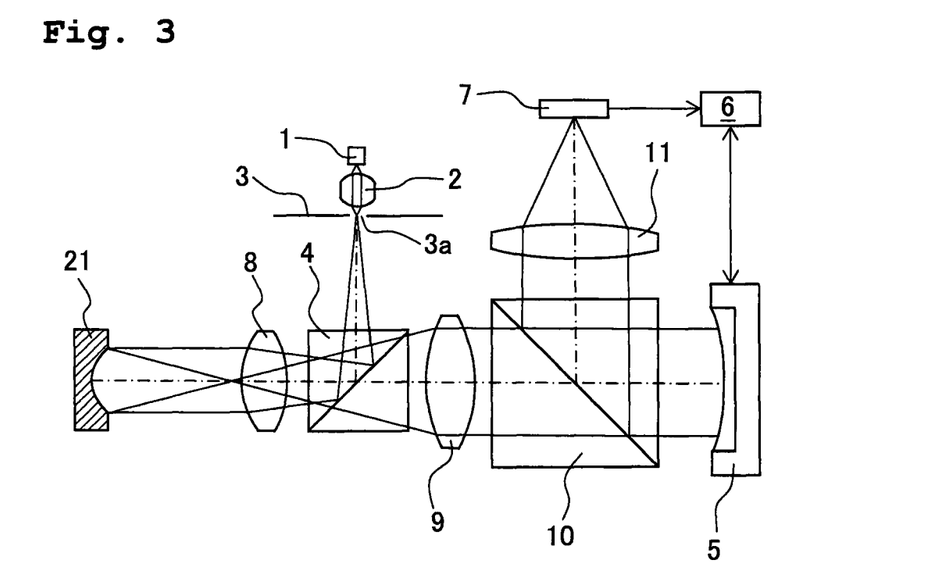
FIG. 3 schematically shows a construction of a wavefront aberration measuring apparatus according to a second embodiment of the present invention.

FIG. 3 schematically shows the construction of a wavefront aberration measuring apparatus according to a second embodiment of the present invention. In the second embodiment, the wavefront aberration measuring apparatus of the present invention is applied to measurement of the wavefront aberration of an optical system to be inspected constructed of one concave reflecting mirror, i.e., a concave mirror 21 to be inspected. An explanation will be made below about the construction, the function, and the effect of the wavefront aberration measuring apparatus according to the second embodiment taking notice of the difference from the first embodiment.

In the wavefront aberration measuring apparatus of the second embodiment, the light radiated from the light source 1 illuminates, via the light-collecting lens 2, the pinhole 3a of the pinhole member 3. The light from the pinhole 3a comes into the beam splitter 4 in a state of the ideal spherical wave. The light, which is reflected by the beam splitter 4, is converted into a parallel light by a lens 8 which functions as a collimator lens, and then the light comes into the concave mirror 21 to be inspected.

The light, which is reflected by the concave mirror 21 to be inspected, forms an image of the pinhole 3a on an optical surface of the lens 8 disposed on the side of the concave mirror 21 to be inspected. After that, the light comes, via the lens 8, into the beam splitter 4. In other words, in the second embodiment, the spacing distance, which is provided between the lens 8 and the concave mirror 21 to be inspected and along the optical axis, is adjusted so that the image of the pinhole 3a is formed on the optical surface of the lens 8 disposed on the side of the concave mirror 21 to be inspected.

The light, which is transmitted through the beam splitter 4, is converted into a parallel light by a collimator lens 9, and then the light comes into a beam splitter 10. The light, which is transmitted through the beam splitter 10, comes into the deformable mirror 5 in such a state that the light can be regarded as a parallel light provided that the influence of the wavefront aberration of the concave mirror 21 to be inspected is neglected. The light, to which the change of the wavefront is applied by the reflection by the deformable mirror 5, comes into the beam splitter 10.

The light which is reflected by the beam splitter 10 forms, via a light-collecting lens 11, an image of the pinhole 3a, i.e., a spot light on the detection surface of the photodetector 7 arranged at the position optically conjugate with the pinhole 3a. The information about the light intensity of the spot light detected by the photodetector 7 is supplied to the control processing system 6 which functions as the measuring section for measuring the wavefront aberration of the concave mirror 21 to be inspected.

Also in the second embodiment, the control processing system 6 appropriately changes the shape of the reflecting surface of the deformable mirror 5 so that the spot light, which is detected by the photodetector 7, has the maximum light intensity, while monitoring the output of the photodetector 7 in the same manner as in the first embodiment. The control processing system 6 measures the wavefront aberration of the concave mirror 21 to be inspected based on the information about the shape of the reflecting surface of the deformable mirror 5 provided when the spot light, which is formed on the detection surface of the photodetector 7, has the maximum light intensity (i.e., the information about the change of the wavefront applied by the deformable mirror 5).

However, in the second embodiment, the spot light, which is formed on the detection surface of the photodetector 7, has the maximum light intensity (size of the spot light is minimized) when the reflecting surface of the concave mirror 21 to be inspected is a parabolic surface having a radius of curvature of a length which is twice the distance ranging from the concerning reflecting surface to the optical surface of the lens 8 disposed on the side of the concave mirror 21 to be inspected along with the optical axis. Therefore, taking this fact into consideration, in the control processing system 6, the information about the change of the wavefront applied by the deformable mirror 5 is calculated and converted into the wavefront aberration of the concave mirror 21 to be inspected. Thus, also in the second embodiment, the wavefront aberration of the concave mirror 21 to be inspected can be measured in accordance with the relatively simple construction, without using the interference method.

The control processing system 6 measures the eccentricity component of the concave mirror 21 to be inspected based on the position information of the spot light formed on the detection surface of the photodetector 7 (for example, the information about the positional deviation, of the position of formation of the spot light, from the center of the detection surface). Alternatively, the control processing system 6 appropriately changes the shape of the reflecting surface of the deformable mirror 5 so that the spot light is moved to a predetermined position of the detection surface of the photodetector 7 (for example, the center position of the detection surface); and the control processing system 6 measures the eccentricity component of the concave mirror 21 to be inspected, based on the inclination component of the shape of the reflecting surface of the deformable mirror 5 provided in this situation (consequently the inclination component of the change of the wavefront applied by the deformable mirror 5).

Figure 4:
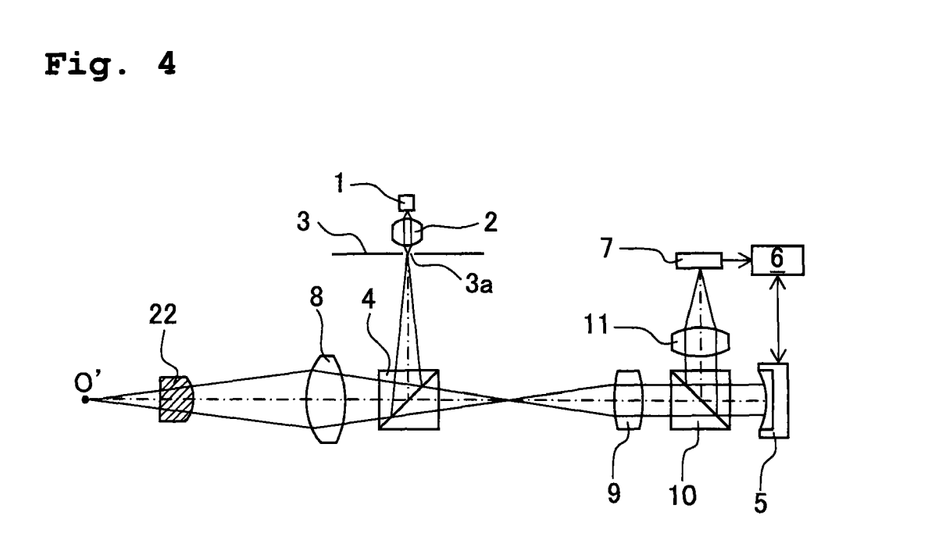
FIG. 4 schematically shows a construction of a wavefront aberration measuring apparatus according to a third embodiment of the present invention.

FIG. 4 schematically shows the construction of a wavefront aberration measuring apparatus according to a third embodiment of the present invention. In the third embodiment, the wavefront aberration measuring apparatus of the present invention is applied to measurement of the wavefront aberration of an optical system to be inspected constructed of one convex reflecting mirror, i.e., a convex mirror 22 to be inspected. An explanation will be made below about the construction, the function, and the effect of the wavefront aberration measuring apparatus according to the third embodiment taking notice of the difference from the first embodiment and the second embodiment.

In the wavefront aberration measuring apparatus of the third embodiment, the light, which is radiated from the light source 1, illuminates, via the light-collecting lens 2, the pinhole 3a of the pinhole member 3. The light from the pinhole 3a comes into the beam splitter 4 in a state of the ideal spherical wave. The light which is reflected by the beam splitter 4 comes, via a lens 8 which functions as a light-collecting lens, into the convex mirror 22 to be inspected perpendicularly so that the light is collected at a center position O' of the curvature of the reflecting surface of the convex mirror 22 to be inspected.

In other words, in the third embodiment, the spacing distance, which is provided between the pinhole 3a and the lens 8 along the optical axis, is adjusted so that the image of the pinhole 3a is formed at the center position O' of the curvature of the reflecting surface of the convex mirror 22 to be inspected in a state that the concave mirror 22 to be inspected does not intervene therebetween. The light which is reflected by the convex mirror 22 to be inspected comes, via the lens 8, into the beam splitter 4.

The light, which is transmitted through the beam splitter 4, forms the image of the pinhole 3a, and then the light is converted into a parallel light by a collimator lens 9. The light comes into a beam splitter 10. The light, which is transmitted through the beam splitter 10, comes into the deformable mirror 5 in such a state that the light can be regarded as a parallel light, provided that the influence of the wavefront aberration of the convex mirror 22 to be inspected is neglected. The light, to which the change of the wavefront is applied by the reflection by the deformable mirror 5, comes into the beam splitter 10.

The light which is reflected by the beam splitter 10 forms, via a light-collecting lens 11, an image of the pinhole 3a, i.e., a spot light on the detection surface of the photodetector 7 arranged at the position optically conjugate with the pinhole 3a. The information about the light intensity of the spot light detected by the photodetector 7 is supplied to the control processing system 6 which functions as the measuring section which measures the wavefront aberration of the convex mirror 22 to be inspected.

Also in the third embodiment, the control processing system 6 appropriately changes the shape of the reflecting surface of the deformable mirror 5 so that the spot light, which is detected by the photodetector 7, has the maximum light intensity, while monitoring the output of the photodetector 7, in the same manner as in the first embodiment. The control processing system 6 measures the wavefront aberration of the convex mirror 22 to be inspected based on the information about the shape of the reflecting surface of the deformable mirror 5 provided when the spot light, which is formed on the detection surface of the photodetector 7, has the maximum light intensity (i.e., the information about the change of the wavefront applied by the deformable mirror 5). Thus, also in the third embodiment, it is possible to measure the wavefront aberration of the convex mirror 22 to be inspected in accordance with the relatively simple construction, without using the interference method.

The control processing system 6 measures the eccentricity component of the convex mirror 22 to be inspected based on the position information of the spot light formed on the detection surface of the photodetector 7 (for example, the information about the positional deviation, of the position of formation of the spot light, from the center of the detection surface).

Alternatively, the control processing system 6 appropriately changes the shape of the reflecting surface of the deformable mirror 5 so that the spot light is moved to a predetermined position of the detection surface of the photodetector 7 (for example, the center position of the detection surface); and the control processing system 6 measures the eccentricity component of the convex mirror 22 to be inspected, based on the inclination component of the shape of the reflecting surface of the deformable mirror 5 provided in this situation (consequently the inclination component of the change of the wavefront applied by the deformable mirror 5).

When the second embodiment and the third embodiment are compared with each other, the wavefront aberration measuring apparatuses are constructed by the elements having mutually identical functions. Therefore, by additionally providing a mechanism which adjusts the spacing distance between the light source unit (light source 1, light-collecting lens 2, and pinhole member 3) and the lens 8, and a mechanism which adjusts the spacing distance between the beam splitter 4 and the detecting and control section (collimator lens 9, beam splitter 10, deformable mirror 5, light-collecting lens 11, photodetector 7, and control processing system 6), it is possible to realize a wavefront aberration measuring apparatus which is applicable to both of the optical system to be inspected constructed of the concave mirror and the optical system to be inspected constructed of the convex mirror.

The wavefront aberration measuring apparatus and the wavefront aberration measuring method according to the present invention have been explained in the embodiments described above. However, the present invention is applicable to a wavefront aberration adjusting method for any optical system to be inspected. The wavefront aberration of the optical system to be inspected has been measured in the first embodiment. Therefore, the measured wavefront aberration can be used to adjust (or correct) the optical system to be inspected so that the wavefront aberration of the optical system to be inspected has a desired value of the wavefront aberration. A specific method thereof will be explained below. It is assumed that an optical system 20 to be inspected, which has a wavefront aberration of a designed value (for example, zero), is the ideal optical system 20 to be inspected. At first, the surface shape of the deformable mirror 5 is set and fixed to such a surface shape that the ideal wavefront aberration, which will be obtained via the ideal optical system 20 to be inspected as described above, is generated. For example, when the wavefront aberration of the ideal optical system 20 to be inspected is zero, it is unnecessary for such an optical system 20 to be inspected that the surface shape of the deformable mirror 5 should be deformed to regulate or adjust the wavefront aberration. Therefore, the surface shape of the deformable mirror 5 is set and fixed to a completely flat surface. The deformable mirror 5, which has been fixed as described above, is installed in the arrangement as shown in FIG. 1. If the wavefront aberration of the optical system 20 to be inspected is in the state of zero (desired wavefront aberration) (if the optical system to be inspected has been already adjusted), the reflected light reflected by the deformable mirror 5 travels reversely as it is along the optical path along which the light has passed through the optical system to be inspected. Therefore, the intensity of the spot light radiated or irradiated onto the photodetector 7 should be maximized. If the wavefront aberration of the optical system 20 to be inspected does not arrive at zero, i.e., if the optical system 20 to be inspected is not adjusted to such a state that the desired wavefront aberration is generated, then the spot light is spread, and hence the detected light intensity is not maximized. Therefore, the adjustment (or the correction) of the optical system 20 to be inspected is repeated so that the intensity of the spot light irradiated onto the photodetector 7 approaches the maximum. The optical system 20 to be inspected can be adjusted or corrected, for example, by polishing the surface of the lens constructing the optical system 20 to be inspected. In a case that the optical system 20 to be inspected is constructed of a plurality of lenses, the adjustment can be performed also by regulating the spacing distance between the lenses. It is possible to evaluate the extent of successful improvement in the wavefront aberration by the adjustment as described above, for example, in accordance with the ratio (Strehl ratio) of the peak intensity of the output light with respect to the peak intensity of the incident light. In the first embodiment, the wavefront aberration of the optical system 20 to be inspected has been already measured successfully. Therefore, the optical system 20 to be inspected can be previously adjusted by polishing, etc., based on the measured amount (preparatory adjustment). The optical system 20 to be inspected, which has been subjected to the preparatory adjustment as described above, is installed in the arrangement as shown in FIG. 1 to confirm whether or not the intensity of the spot light of the photodetector 7 is maximized. If the intensity of the spot light of the photodetector 7 is not maximized, then the optical system 20 to be inspected is adjusted again, and then the optical system 20 to be inspected is installed in the arrangement as shown in FIG. 1 to inspect the intensity of the spot light. By repeating this operation, it is possible to adjust (or correct) the optical system to be inspected efficiently and reliably.

Figure 5:
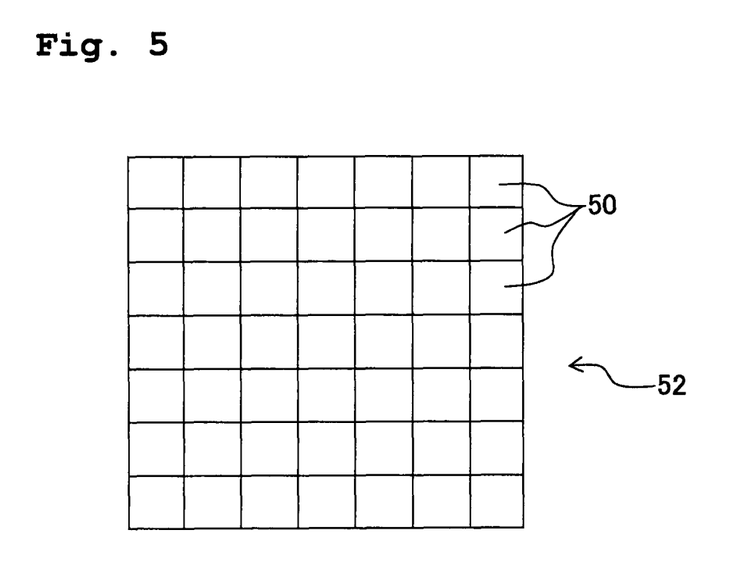
FIG. 5 schematically shows a two-dimensional reflecting mirror array having a plurality of mirror elements usable in a modified embodiment of the present invention.

In the respective embodiments described above, the deformable mirror (mirror capable of deformation) 5, which has one deformable continuous reflecting surface, is used as the wavefront change applying section which is arranged in the optical path between the point light source (3a, 1 to 3) and the photodetector 7 and which applies or gives the change of the wavefront to the light allowed to pass through the optical system to be inspected (20, 21, 22). However, the present invention is not limited to this; and as shown in FIG. 5, it is also possible to use, as the wavefront change applying section, a two-dimensional reflecting mirror array 51, for example, a two-dimensional MEMS array having a plurality of mirror elements 50 which are arranged two-dimensionally in parallel and which independently change their postures or attitudes. In this case, as shown in FIG. 2, the mirror elements 50 can be driven independently by the driving elements 5b respectively. The present invention is not limited to this; and it is possible to adopt various forms or modes in relation to the arrangement or construction of the wavefront change applying section which applies the wavefront change to the light allowed to pass through the optical system to be inspected. For example, a fluid having a predetermined refractive index may be charged beforehand into a plurality of chambers or rooms which are comparted two-dimensionally; and the optical path length of each of the chambers and/or the refractive index of the fluid may be changed independently, thereby making it possible to apply the wavefront change to the light transmitted through the chambers. In this case, the light, which is transmitted through the wavefront change applying section, can be reflected by using a plane mirror so that the light is returned to the optical system to be inspected.

It is not necessarily indispensable that the wavefront aberration measuring apparatuses and the wavefront aberration adjusting mechanisms of the embodiments described above should be provided with the light source. It is possible to utilize any light source installed at the place at which the measurement and/or the adjustment is/are performed. In the embodiments described above, the specified optical element is used to effect the function such as the collection, the reflection, and the division of the light. However, the present invention is not limited to the use of the specified optical element as described above. It is possible to use any arbitrary optical element which provides the function as described above.

The wavefront aberration measuring apparatus and the wavefront aberration measuring method of the present invention make it possible to easily measure the wavefront aberration of the optical system to be inspected, without using the interference method. Therefore, the wavefront aberration measuring apparatus and the wavefront aberration measuring method of the present invention are extremely effective to adjust the optical system.

What is claimed is:

1. A wavefront aberration measuring apparatus which measures a wavefront aberration of an optical system to be inspected without using an interference method, the wavefront aberration measuring apparatus comprising:
   a point light source configured to supply a measuring light;
   a photodetector comprising a detection surface arranged at a position optically conjugate with the point light source, the photodetector being configured to measure a light intensity of a spot light formed on the detection surface;
   a wavefront change applying section arranged in an optical path between the point light source and the photodetector, the wavefront change applying section being configured to apply a wavefront change to the light outcome from the optical system based on an output of the photodetector so that the light intensity which is measured by the photodetector is maximized; and
   a measuring section configured to measure the wavefront aberration of the optical system, without using the interference method, based on the output of the photodetector and the wavefront change applied by the wavefront change applying section,
   wherein the optical system is arranged with respect to the point light source such that the light outcome from the optical system into the wavefront change applying section as a parallel light.

2. The wavefront aberration measuring apparatus according to claim 1, wherein the measuring section is further configured to measure an eccentricity component of the optical system based on an inclination component of the wavefront change applied so that a position of the spot light formed on the detection surface is moved to a predetermined position.

3. The wavefront aberration measuring apparatus according to claim 1, wherein the measuring section is further configured to measure an eccentricity component of the optical system based on position information about the spot light formed on the detection surface.

4. The wavefront aberration measuring apparatus according to claim 1, wherein the wavefront change applying section comprises a deformable reflecting surface and a driving element configured to drive the deformable reflecting surface.

5. The wavefront aberration measuring apparatus according to claim 1, wherein the wavefront change applying section comprises:
   a plurality of mirror elements arranged two-dimensionally in parallel, where the postures of each of the plurality of mirror elements are configured to change independently, and
   a driving element configured to drive the plurality of mirror elements.

6. The wavefront aberration measuring apparatus according to claim 1, wherein the point light source is an incoherent light source.

7. The wavefront aberration measuring apparatus according to claim 4, further comprising a controller configured to control the driving element,
wherein the controller controls the driving element so that the light intensity of the spot light formed on the detection surface is maximized.

8. A wavefront aberration measuring method for measuring a wavefront aberration of an optical system to be inspected without using an interference method, the wavefront aberration measuring method comprising steps of:
applying a wavefront change to a light radiated from a point light source and outcome from the optical system;
detecting a spot light formed on a predetermined surface optically conjugate with the point light source, with the light to which the wavefront change is applied;
measuring a light intensity of the spot light formed on the predetermined surface; and
measuring the wavefront aberration of the optical system, without using the interference method, based on the wavefront change applied so that the measured light intensity of the spot light is maximized,
wherein in the step of applying of the wavefront change, the wavefront change is applied to the light radiated from the point light source and outcome from the optical system, based on a result of the measuring of the light intensity of the spot light formed on the predetermined surface, so that the light intensity to be measured is maximized, and
the optical system is arranged with respect to the point light source such that the light outcome from the optical system is a parallel light and the wavefront change is applied to the parallel light.

9. The wavefront aberration measuring method according to claim 8, wherein an eccentricity component of the optical system is measured based on the wavefront change applied so that a position of the spot light is moved to a predetermined position.

10. The wavefront aberration measuring method according to claim 8, wherein an eccentricity component of the optical system is measured based on position information about the spot light.

11. The wavefront aberration measuring method according to claim 8, wherein the wavefront change is applied to the light outcome from the optical system by a variable mirror.

12. A wavefront aberration adjusting method for adjusting the wavefront aberration of an optical system without using an interference method, the wavefront aberration adjusting method comprising steps of:
applying a wavefront change to a light radiated from a point light source and outcome from the optical system;
detecting a spot light formed on a predetermined surface optically conjugate with the point light source, with the light to which the wavefront change is applied;
measuring a light intensity of the spot light formed on the predetermined surface; and
measuring the wavefront aberration of the optical system, without using the interference method, based on the wavefront change applied so that the light intensity of the spot light is maximized,
wherein the wavefront change is applied to the light outcome from the optical system by a variable mirror, and
wherein in the step of applying of the wavefront change, the wavefront change is applied to the light radiated from the point light source and outcome from the optical system, based on a measuring result of the light intensity of the spot light formed on the predetermined surface, so that the light intensity to be measured is maximized, and
the optical system is arranged with respect to the point light source such that the light outcome from the optical system is a parallel light and the wavefront change is applied to the parallel light.

13. The wavefront aberration adjusting method for adjusting the wavefront aberration of the optical system according to claim 12, the wavefront aberration adjusting method further comprising:
fixing the variable mirror in a state that a desired wavefront aberration is generated with respect to the optical system having the wavefront aberration of a designed value, and
adjusting the wavefront aberration of the optical system so that the light intensity of the spot light is maximized.

* * * * *